United States Patent Office 3,014,815
Patented Dec. 26, 1961

3,014,815
METHOD OF PROVIDING ARTICLES WITH METAL OXIDE LAYERS
Jan Anthony Lely and Julius Goeman Bos, Eindhoven, Netherlands, assignors to North American Philips Company, Inc., New York, N.Y., a corporation of Delaware
No Drawing. Filed Oct. 16, 1958, Ser. No. 767,510
Claims priority, application Netherlands Nov. 4, 1957
5 Claims. (Cl. 117—106)

The present invention relates to methods of providing articles with metal oxide layers which, depending upon their composition, may either be electrically insulating or conducting or may have desired light reflective properties.

It is known that such oxide layers are obtainable by treating the articles with hydrolysable metal compounds while heating in the presence of water, the oxide thus depositing on the articles. Depending upon the temperatures required for depositing the layers these can be provided on articles consisting of glass, quartz, ceramic materials or metal.

To this end, the heated articles are frequently sprayed with a mist of an atomized solution of hydrolysable compounds. Alternatively, it has been proposed to treat articles with fumes of volatile, hydrolysable compounds.

In these known ways, it is possible to obtain layers of oxides of various metals, for example tin, indium, silicon or titanium. By combination with other oxides, the properties of the layers can be modified. Thus, for example, the addition of antimony or phosphorus to tin oxide permits the conductivity to be increased. Halides, in particular chlorides such as $SnCl_4$, are often used as hydrolysable metal compounds.

A disadvantage in the method, in which the articles are sprayed with a mist of an atomized solution of a hydrolysable compound, is the considerable loss of material, particularly when coating small articles, since only a small fraction of the atomized particles of the solution reaches the surface to be coated. Usually, the efficiency in respect of material is under 1%. Further, the hydrolysis-reaction partially occurs prior to reaching the surface to be coated, which may cause inhomogeneity of the layer which, moreover, is uneven when using a spraying method.

A further disadvantage attaching to this method is the use of large amounts of solvent, for example ethyl acetate or aqueous hydrochloric acid, which is completely wasted. A further disadvantage is that the heated articles cool rapidly when spraying, so that the layers obtained are extremely thin, in general thinner than $\frac{1}{2}\mu$. For providing thicker layers, which are particularly suitable in mechanical and electrical respect for resistors, the treatment has to be repeated several times.

In many respects, therefore, the conventional method in which the articles are brought into contact in air with the fumes of a volatile hydrolysable metal compound, is more promising. In this case, however, the disadvantage that reaction with water present in the air occurs prior to reaching the surface to be coated is greater than when using an atomized solution of the metal compound.

In accordance with the invention, articles are provided with a metal oxide layer by treating them in a gaseous atmosphere which contains a hydrolysable metal compound and is free from substances which themselves are capable of reacting to form non-volatile metal compounds, and which further contains substances capable by reaction at elevated temperature, of forming the water needed for hydrolysis, the articles being heated in this gaseous atmosphere at a temperature at which water forms and hydrolysis and oxide deposition occur.

The water needed for hydrolysis can be formed by adding oxygen and hydrogen to the gas. The formation of water requires heating the articles to a temperature of at least approximately 600° C. Alternatively, the water may, for example be formed by combustion of organic compounds, for example methyl formiate or ether, not reacting with the hydrolysable material. Naturally, substances such as acetone and methanol, which react with the formation of non-volatile compounds, are not employed.

The gaseous atmosphere may also contain other gases not partaking in the reactions, for example nitrogen, $CO_2$ and inert rare gases, as a carrier gas for the reaction constituents.

As a result of the absence of materials in the gaseous atmosphere, which themselves may cause hydrolysis of the metal compound, and since, at the temperatures entering into account, the materials from which water has to be formed cannot react spontaneously in the gaseous atmosphere but only at hot surfaces premature hydrolysis is greatly reduced in the method according to the invention. This permits the method to be carried out in a current of gas without fouling the equipment.

When coating large numbers of small-sized articles, for example ceramic rods or tubes for the manufacture of resistors, it is thus possible to proceed quite similarly as in the manufacture of carbon resistors by depositing a layer of carbon onto ceramic supports from a hydrocarbon-containing atmosphere, the tubes being heated to the reaction temperature, for example in a rotating vessel, through which a hydrocarbon-containing current of gas is passed.

Since the volatile, hydrolysable metal compounds employed in carrying out the invention, at variance with the gases employed in the manufacture of carbon resistors, react rapidly in air with the water present therein, for example when using chlorides with the formation of hydrochloric acid, the introduction of a fresh charge of articles may involve difficulties. These are easily avoidable by introducing the hydrolysable compounds not as such into the apparatus, but by forming these compounds in the apparatus from materials not reacting with air, or in air at normal temperatures and by stopping the synthesis prior to opening the apparatus. Thus, for example, $SnCl_4$ and $SbCl_3$ used for providing bodies with a conductive antimony-containing tin oxide layer, are advantageously obtained by chlorination of tin dioxide and of antimony with $CCl_4$ in an inert gas at temperatures over 600° C. and 300° C. respectively.

When proceeding according to the invention, the efficiency in respect to the deposition material is particularly advantageous. Of the total quantity of hydrolysable compound generally more than 20% and sometimes even up to 40% deposits in the form of oxide layers on the articles.

A further advantage is that layers $10\mu$ and thicker are readily obtainable in a single operation.

As has been found upon examination under an electron-microscope, the coats according to the invention are much more uniform than layers obtained by spraying a solution.

The invention will now be described in detail by giving a few examples.

*Example 1*

1100 porcelain rods 4 mms. in diameter and 15 mms. long were introduced into a vessel of sintered quartz together with a quantity of sand which does not completely fill up the interstices between the rods. The presence of sand prevents damage to the rods. The vessel is rotated, for example 10 to 50 revolutions per minute, about a horizontal shaft and heated for 20 minutes at a temperature of 700° C. while passing dry air (dew point under —70° C.) through it. At this temperature, a current of gas of the following composition is passed for 30 minutes through the rotating vessel:

2 litres/min. of dry air;
0.75 litres/min. of dry nitrogen with 7.5% of hydrogen;
0.1 litre/min. of dry nitrogen as a vehicle for the vapour of $SnCl_4$ and $SbCl_3$;
0.20 millimol/min. of $SnCl_4$;
0.06 millimol/min. of $SbCl_3$.

followed by cooling while passing dry air through the vessel. It was found that a layer $0.18\mu$ thick of antimony-containing tin oxide having an average weight of 0.27 mg. per rod had deposited on the rods. Efficiency 25%. Resistance per square surface area 1000 ohms.

*Example II*

In the manner set out in Example I, ceramic tubes 15 mms. long, 4 mms. outside diameter and 1 mm. inside diameter were treated for 2 hours in a current of gas consisting of 3 litres/min. of air;
1.5 litres/min. of nitrogen with 7.5% of $H_2$;
0.1 litre/min. of nitrogen as a vehicle for $SnCl_4$ and $SbCl_3$;
1.3 millimols/min. of $SnCl_4$;
0.032 millimol/min. of $SbCl_3$.

In this instance, the layer thickness was $3.25\mu$ and the layers had an average weight of 4.96 mgs. The efficiency in respect of material was 23%. Resistance per square surface area 3 ohms.

As a result of the fact that the formation of water in the gas is a surface reaction, and the gas mixture has substantially finished reacting when reaching the tubes, hardly any oxide deposits on the inner wall of the tubes. In general, it has been found that no oxide deposits in the tubes at a distance of more than half the inner diameter from the ends.

*Example III*

200 porcelain rods were treated in the manner referred to in Example I, methyl formiate being employed as the source of the necessary hydrogen.

The current of gas had the following composition:

3 litres/min. of air;
1 millimol/min. of methyl formiate;
0.1 litre/min. of nitrogen as a vehicle for $SnCl_4$ and $SbCl_3$;
0.5 millimol/min. of $SnCl_4$;
0.025 millimol/min. of $SbCl_3$.

In this current of gas, the rods were heated at 600° C. for 30 minutes. Resistance per square surface area of the coats 350 ohms.

*Example IV*

400 porcelain rods 23.5 mms. long and 5.7 mms. in diameter were coated with $TiO_2$ in the manner set out in Example I. For this purpose, the rods were treated at a temperature of 650° C. for 30 minutes in a current of gas having the following composition:

3 litres/min. of air;
0.5 litre/min. of nitrogen with 7.5% of $H_2$;
0.1 litre/min. of nitrogen as a vehicle for $TiCl_4$;
1 millimol/min. of $TiCl_4$.

On an average 0.9 mg. of $TiO_2$ in a layer thickness of $0.45\mu$ was deposited per rod. Efficiency 15%.

What is claimed is:

1. A method of providing metal oxide coating on solid articles comprising the steps, placing said articles in a gaseous atmosphere containing oxygen and vapours of a hydrolysable metal compound and substances which react with oxygen to form water at elevated temperatures and heating said articles at a temperature at which water is formed and hydrolysis and oxidation of the hydrolysable metal compound occurs at the surface of said articles.

2. The method of claim 1 wherein the heated solid articles are rotated while a current of the gaseous atmosphere is brought into contact with said articles.

3. A method of providing metal oxide coating on solid articles comprising the steps, placing said articles in a gaseous atmosphere containing oxygen and vapours of a hydrolysable metal compound and hydrogen and heating said articles at a temperature at which water is formed and hydrolysis and oxidation of the hydrolysable metal compound occurs at the surface of said articles.

4. The method of claim 1 in which the atmosphere in addition contains an inert gas.

5. A method of providing metal oxide coating on solid articles comprising the steps, placing said articles in a gaseous atmosphere containing oxygen and vapours of a hydrolysable metal compound and substances including an organic compound inert to the hydrolysable metal compound which react with oxygen to form water at elevated temperatures and heating said articles at a temperature at which water is formed and hydrolysis and oxidation of the hydrolysable metal compound occurs at the surface of said articles.

References Cited in the file of this patent

UNITED STATES PATENTS

| 933,324 | Mowry | Sept. 7, 1909 |
| 2,272,342 | Hyde | Feb. 10, 1942 |
| 2,651,585 | Lytle et al. | Sept. 8, 1953 |
| 2,860,598 | Loesche | Nov. 18, 1958 |

FOREIGN PATENTS

| 941,687 | Germany | Apr. 19, 1956 |